US011423686B2

(12) United States Patent
Tsai et al.

(10) Patent No.: US 11,423,686 B2
(45) Date of Patent: Aug. 23, 2022

(54) INTEGRATED FINGERPRINT AND FORCE SENSOR

(71) Applicant: NEXTINPUT, INC., Mountain View, CA (US)

(72) Inventors: Julius Minglin Tsai, San Jose, CA (US); Dan Benjamin, Atlanta, GA (US)

(73) Assignee: Qorvo US, Inc., Greensboro, NC (US)

( * ) Notice: Subject to any disclaimer, the term of this patent is extended or adjusted under 35 U.S.C. 154(b) by 200 days.

(21) Appl. No.: 16/634,495

(22) PCT Filed: Jul. 25, 2018

(86) PCT No.: PCT/US2018/043616
§ 371 (c)(1),
(2) Date: Jan. 27, 2020

(87) PCT Pub. No.: WO2019/023309
PCT Pub. Date: Jan. 31, 2019

(65) Prior Publication Data
US 2020/0234023 A1 Jul. 23, 2020

Related U.S. Application Data

(60) Provisional application No. 62/536,645, filed on Jul. 25, 2017.

(51) Int. Cl.
*G06K 9/00* (2022.01)
*G06V 40/13* (2022.01)
(Continued)

(52) U.S. Cl.
CPC ............ *G06V 40/1306* (2022.01); *G01L 1/16* (2013.01); *G01L 1/18* (2013.01); *G01L 1/205* (2013.01); *G01L 1/2293* (2013.01); *G06F 3/041* (2013.01)

(58) Field of Classification Search
CPC ........... G06K 9/0002; G01L 1/16; G01L 1/18; G01L 1/205; G06V 40/1306
See application file for complete search history.

(56) References Cited

U.S. PATENT DOCUMENTS 4,594,639 A 6/1986 Kuisma
4,658,651 A 4/1987 Le
(Continued)

FOREIGN PATENT DOCUMENTS

CN 101341459 A 1/2009
CN 101458134 A 6/2009
(Continued)

OTHER PUBLICATIONS

Mei, T., et al., "Design and Fabrication of an Integrated Three-Dimensional Tactile Sensor for Space Robotic Applications," Micro Electro Mechanical Systems, MEMS '99, Twelfth IEEE International Conference, Orlando Florida, Jan. 21, 1999, pp. 112-117.
(Continued)

*Primary Examiner* — Abdul-Samad A Adediran
(74) *Attorney, Agent, or Firm* — Withrow & Terranova, P.L.L.C.

(57) ABSTRACT

Described herein is a ruggedized microelectromechanical ("MEMS") sensor including both fingerprint and force sensing elements and integrated with complementary metal-oxide-semiconductor ("CMOS") circuitry on the same chip. The sensor employs either piezoresistive or piezoelectric sensing elements for detecting force and also capacitive or ultrasonic sensing elements for detecting fingerprint patterns. Both force and fingerprint sensing elements are electrically connected to integrated circuits on the same chip. The integrated circuits can amplify, digitize, calibrate, store, and/or communicate force values and/or fingerprint patterns through output pads to external circuitry.

20 Claims, 6 Drawing Sheets

(51) Int. Cl.
  *G01L 1/16* (2006.01)
  *G01L 1/18* (2006.01)
  *G01L 1/20* (2006.01)
  *G06F 3/041* (2006.01)
  *G01L 1/22* (2006.01)

(56) References Cited

U.S. PATENT DOCUMENTS

| | | |
|---|---|---|
| 4,814,856 A | 3/1989 | Kurtz et al. |
| 4,849,730 A | 7/1989 | Izumi et al. |
| 4,914,624 A | 4/1990 | Dunthorn |
| 4,918,262 A | 4/1990 | Flowers et al. |
| 4,933,660 A | 6/1990 | Wynne |
| 4,983,786 A | 1/1991 | Stevens |
| 5,095,401 A | 3/1992 | Zavracky et al. |
| 5,159,159 A | 10/1992 | Asher |
| 5,166,612 A | 11/1992 | Murdock |
| 5,237,879 A | 8/1993 | Speeter |
| 5,320,705 A | 6/1994 | Fujii et al. |
| 5,333,505 A | 8/1994 | Takahashi et al. |
| 5,343,220 A | 8/1994 | Veasy et al. |
| 5,349,746 A | 9/1994 | Gruenwald et al. |
| 5,351,550 A | 10/1994 | Maurer |
| 5,483,994 A | 1/1996 | Maurer |
| 5,510,812 A | 4/1996 | O'Mara et al. |
| 5,541,372 A | 7/1996 | Baller et al. |
| 5,543,591 A | 8/1996 | Gillespie et al. |
| 5,565,657 A | 10/1996 | Merz |
| 5,600,074 A | 2/1997 | Marek et al. |
| 5,673,066 A | 9/1997 | Toda et al. |
| 5,773,728 A | 6/1998 | Tsukada et al. |
| 5,889,236 A | 3/1999 | Gillespie et al. |
| 5,921,896 A | 7/1999 | Boland |
| 5,969,591 A | 10/1999 | Fung |
| 6,012,336 A | 1/2000 | Eaton et al. |
| 6,028,271 A | 2/2000 | Gillespie et al. |
| 6,159,166 A | 12/2000 | Chesney et al. |
| 6,243,075 B1 | 6/2001 | Fishkin et al. |
| 6,348,663 B1 | 2/2002 | Schoos et al. |
| 6,351,205 B1 | 2/2002 | Armstrong |
| 6,360,598 B1 | 3/2002 | Calame et al. |
| 6,437,682 B1 | 8/2002 | Vance |
| 6,555,235 B1 | 4/2003 | Aufderheide et al. |
| 6,556,189 B1 | 4/2003 | Takahata et al. |
| 6,569,108 B2 | 5/2003 | Sarvazyan et al. |
| 6,610,936 B2 | 8/2003 | Gillespie et al. |
| 6,620,115 B2 | 9/2003 | Sarvazyan et al. |
| 6,629,343 B1 | 10/2003 | Chesney et al. |
| 6,668,230 B2 | 12/2003 | Mansky et al. |
| 6,720,712 B2 | 4/2004 | Scott et al. |
| 6,788,297 B2 | 9/2004 | Itoh et al. |
| 6,801,191 B2 | 10/2004 | Mukai et al. |
| 6,809,280 B2 | 10/2004 | Divigalpitiya et al. |
| 6,812,621 B2 | 11/2004 | Scott |
| 6,822,640 B2 | 11/2004 | Derocher |
| 6,868,731 B1 | 3/2005 | Gatesman |
| 6,879,318 B1 | 4/2005 | Chan et al. |
| 6,888,537 B2 | 5/2005 | Benson et al. |
| 6,915,702 B2 | 7/2005 | Omura et al. |
| 6,931,938 B2 | 8/2005 | Knirck et al. |
| 6,995,752 B2 | 2/2006 | Lu |
| 7,138,984 B1 | 11/2006 | Miles |
| 7,173,607 B2 | 2/2007 | Matsumoto et al. |
| 7,190,350 B2 | 3/2007 | Roberts |
| 7,215,329 B2 | 5/2007 | Yoshikawa et al. |
| 7,218,313 B2 | 5/2007 | Marcus et al. |
| 7,224,257 B2 | 5/2007 | Morikawa |
| 7,245,293 B2 | 7/2007 | Hoshino et al. |
| 7,273,979 B2 | 9/2007 | Christensen |
| 7,280,097 B2 | 10/2007 | Chen et al. |
| 7,318,349 B2 | 1/2008 | Vaganov et al. |
| 7,324,094 B2 | 1/2008 | Moilanen et al. |
| 7,324,095 B2 | 1/2008 | Sharma |
| 7,336,260 B2 | 2/2008 | Martin et al. |
| 7,337,085 B2 | 2/2008 | Soss |
| 7,345,680 B2 | 3/2008 | David |
| 7,367,232 B2 | 5/2008 | Vaganov |
| 7,406,661 B2 | 7/2008 | Väänänen et al. |
| 7,425,749 B2 | 9/2008 | Hartzell et al. |
| 7,426,873 B1 | 9/2008 | Kholwadwala et al. |
| 7,449,758 B2 | 11/2008 | Axelrod et al. |
| 7,460,109 B2 | 12/2008 | Satai et al. |
| 7,476,952 B2 | 1/2009 | Vaganov et al. |
| 7,508,040 B2 | 3/2009 | Nikkei et al. |
| 7,554,167 B2 | 6/2009 | Vaganov |
| 7,607,111 B2 | 10/2009 | Vaananen et al. |
| 7,620,521 B2 | 11/2009 | Breed et al. |
| 7,629,969 B2 | 12/2009 | Kent |
| 7,649,522 B2 | 1/2010 | Chen et al. |
| 7,663,612 B2 | 2/2010 | Bladt |
| 7,685,538 B2 | 3/2010 | Fleck et al. |
| 7,698,084 B2 | 4/2010 | Soss |
| 7,701,445 B2 | 4/2010 | Inokawa et al. |
| 7,746,327 B2 | 6/2010 | Miyakoshi |
| 7,791,151 B2 | 9/2010 | Vaganov et al. |
| 7,819,998 B2 | 10/2010 | David |
| 7,825,911 B2 | 11/2010 | Sano et al. |
| 7,829,960 B2 | 11/2010 | Takizawa |
| 7,903,090 B2 | 3/2011 | Soss et al. |
| 7,921,725 B2 | 4/2011 | Silverbrook et al. |
| 7,952,566 B2 | 5/2011 | Poupyrev et al. |
| 7,973,772 B2 | 7/2011 | Gettemy et al. |
| 7,973,778 B2 | 7/2011 | Chen |
| 8,004,052 B2 | 8/2011 | Vaganov |
| 8,004,501 B2 | 8/2011 | Harrison |
| 8,013,843 B2 | 9/2011 | Pryor |
| 8,026,906 B2 | 9/2011 | Mölne et al. |
| 8,044,929 B2 | 10/2011 | Baldo et al. |
| 8,068,100 B2 | 11/2011 | Pryor |
| 8,072,437 B2 | 12/2011 | Miller et al. |
| 8,072,440 B2 | 12/2011 | Pryor |
| 8,096,188 B2 | 1/2012 | Wilner |
| 8,113,065 B2 | 2/2012 | Ohsato et al. |
| 8,120,586 B2 | 2/2012 | Hsu et al. |
| 8,120,588 B2 | 2/2012 | Klinghult |
| 8,130,207 B2 | 3/2012 | Nurmi et al. |
| 8,134,535 B2 | 3/2012 | Choi et al. |
| 8,139,038 B2 | 3/2012 | Chueh et al. |
| 8,144,133 B2 | 3/2012 | Wang et al. |
| 8,149,211 B2 | 4/2012 | Hayakawa et al. |
| 8,154,528 B2 | 4/2012 | Chen et al. |
| 8,159,473 B2 | 4/2012 | Cheng et al. |
| 8,164,573 B2 | 4/2012 | DaCosta et al. |
| 8,183,077 B2 | 5/2012 | Vaganov et al. |
| 8,184,093 B2 | 5/2012 | Tsuiki |
| 8,188,985 B2 | 5/2012 | Hillis et al. |
| 8,199,116 B2 | 6/2012 | Jeon et al. |
| 8,212,790 B2 | 7/2012 | Rimas-Ribikauskas et al. |
| 8,237,537 B2 | 8/2012 | Kurtz et al. |
| 8,243,035 B2 | 8/2012 | Abe et al. |
| 8,250,921 B2 | 8/2012 | Nasiri et al. |
| 8,253,699 B2 | 8/2012 | Son |
| 8,260,337 B2 | 9/2012 | Periyalwar et al. |
| 8,269,731 B2 | 9/2012 | Mölne |
| 8,289,288 B2 | 10/2012 | Whytock et al. |
| 8,289,290 B2 | 10/2012 | Klinghult |
| 8,297,127 B2 | 10/2012 | Wade et al. |
| 8,319,739 B2 | 11/2012 | Chu et al. |
| 8,325,143 B2 | 12/2012 | Destura et al. |
| 8,350,345 B2 | 1/2013 | Vaganov |
| 8,363,020 B2 | 1/2013 | Li et al. |
| 8,363,022 B2 | 1/2013 | Tho et al. |
| 8,378,798 B2 | 2/2013 | Bells et al. |
| 8,378,991 B2 | 2/2013 | Jeon et al. |
| 8,384,677 B2 | 2/2013 | Mak-Fan et al. |
| 8,387,464 B2 | 3/2013 | McNeil et al. |
| 8,405,631 B2 | 3/2013 | Chu et al. |
| 8,405,632 B2 | 3/2013 | Chu et al. |
| 8,421,609 B2 | 4/2013 | Kim et al. |
| 8,427,441 B2 | 4/2013 | Paleczny et al. |
| 8,436,806 B2 | 5/2013 | Almalki et al. |
| 8,436,827 B1 | 5/2013 | Zhai et al. |
| 8,451,245 B2 | 5/2013 | Heubel et al. |
| 8,456,440 B2 | 6/2013 | Abe et al. |

(56) References Cited

U.S. PATENT DOCUMENTS

| | | |
|---|---|---|
| 8,466,889 B2 | 6/2013 | Tong et al. |
| 8,477,115 B2 | 7/2013 | Rekimoto |
| 8,482,372 B2 | 7/2013 | Kurtz et al. |
| 8,493,189 B2 | 7/2013 | Suzuki |
| 8,497,757 B2 | 7/2013 | Kurtz et al. |
| 8,516,906 B2 | 8/2013 | Umetsu et al. |
| 8,931,347 B2 | 1/2015 | Donzier et al. |
| 8,973,446 B2 | 3/2015 | Fukuzawa et al. |
| 8,984,951 B2 | 3/2015 | Landmann et al. |
| 9,032,818 B2 | 5/2015 | Campbell et al. |
| 9,097,600 B2 | 8/2015 | Khandani |
| 9,487,388 B2 | 11/2016 | Brosch |
| 9,493,342 B2 | 11/2016 | Brosch |
| 9,709,509 B1 | 7/2017 | Yang et al. |
| 9,772,245 B2 | 9/2017 | Besling et al. |
| 10,962,427 B2 | 3/2021 | Youssefi et al. |
| 2001/0009112 A1 | 7/2001 | Delaye |
| 2003/0067448 A1 | 4/2003 | Park |
| 2003/0128181 A1 | 7/2003 | Poole |
| 2003/0189552 A1 | 10/2003 | Chuang et al. |
| 2004/0012572 A1 | 1/2004 | Sowden et al. |
| 2004/0140966 A1 | 7/2004 | Marggraff et al. |
| 2005/0083310 A1 | 4/2005 | Safai et al. |
| 2005/0190152 A1 | 9/2005 | Vaganov |
| 2006/0028441 A1 | 2/2006 | Armstrong |
| 2006/0244733 A1 | 11/2006 | Geaghan |
| 2006/0272413 A1 | 12/2006 | Vaganov et al. |
| 2006/0284856 A1 | 12/2006 | Soss |
| 2007/0035525 A1 | 2/2007 | Yeh et al. |
| 2007/0046649 A1 | 3/2007 | Reiner |
| 2007/0070046 A1 | 3/2007 | Sheynblat et al. |
| 2007/0070053 A1 | 3/2007 | Lapstun et al. |
| 2007/0097095 A1 | 5/2007 | Kim et al. |
| 2007/0103449 A1 | 5/2007 | Laitinen et al. |
| 2007/0103452 A1 | 5/2007 | Wakai et al. |
| 2007/0115265 A1 | 5/2007 | Rainisto |
| 2007/0132717 A1 | 6/2007 | Wang et al. |
| 2007/0137901 A1 | 6/2007 | Chen |
| 2007/0139391 A1 | 6/2007 | Bischoff |
| 2007/0152959 A1 | 7/2007 | Peters |
| 2007/0156723 A1 | 7/2007 | Vaananen |
| 2007/0182864 A1 | 8/2007 | Stoneham et al. |
| 2007/0229478 A1 | 10/2007 | Rosenberg et al. |
| 2007/0235231 A1 | 10/2007 | Loomis et al. |
| 2007/0245836 A1 | 10/2007 | Vaganov |
| 2007/0262965 A1 | 11/2007 | Hirai et al. |
| 2007/0277616 A1 | 12/2007 | Nikkel et al. |
| 2007/0298883 A1 | 12/2007 | Feldman et al. |
| 2008/0001923 A1 | 1/2008 | Hall et al. |
| 2008/0007532 A1 | 1/2008 | Chen |
| 2008/0010616 A1 | 1/2008 | Algreatly |
| 2008/0024454 A1 | 1/2008 | Everest |
| 2008/0030482 A1 | 2/2008 | Elwell et al. |
| 2008/0036743 A1 | 2/2008 | Westerman et al. |
| 2008/0083962 A1 | 4/2008 | Vaganov |
| 2008/0088600 A1 | 4/2008 | Prest et al. |
| 2008/0088602 A1 | 4/2008 | Hotelling |
| 2008/0094367 A1 | 4/2008 | Van De Ven et al. |
| 2008/0105057 A1 | 5/2008 | Wade |
| 2008/0105470 A1 | 5/2008 | Van De Ven et al. |
| 2008/0106523 A1 | 5/2008 | Conrad |
| 2008/0174852 A1 | 7/2008 | Hirai et al. |
| 2008/0180402 A1 | 7/2008 | Yoo et al. |
| 2008/0180405 A1 | 7/2008 | Han et al. |
| 2008/0180406 A1 | 7/2008 | Han et al. |
| 2008/0202249 A1 | 8/2008 | Yokura et al. |
| 2008/0204427 A1 | 8/2008 | Heesemans et al. |
| 2008/0211766 A1 | 9/2008 | Westerman et al. |
| 2008/0238446 A1 | 10/2008 | DeNatale et al. |
| 2008/0238884 A1 | 10/2008 | Harish |
| 2008/0259046 A1 | 10/2008 | Carsanaro |
| 2008/0284742 A1 | 11/2008 | Prest et al. |
| 2008/0303799 A1 | 12/2008 | Schwesig et al. |
| 2009/0027352 A1 | 1/2009 | Abele |
| 2009/0027353 A1 | 1/2009 | Im et al. |
| 2009/0046110 A1 | 2/2009 | Sadler et al. |
| 2009/0102805 A1 | 4/2009 | Meijer et al. |
| 2009/0140985 A1 | 6/2009 | Liu |
| 2009/0184921 A1 | 7/2009 | Scott et al. |
| 2009/0184936 A1 | 7/2009 | Algreatly |
| 2009/0213066 A1 | 8/2009 | Hardacker et al. |
| 2009/0237275 A1 | 9/2009 | Vaganov |
| 2009/0237374 A1 | 9/2009 | Li et al. |
| 2009/0242282 A1 | 10/2009 | Kim et al. |
| 2009/0243817 A1 | 10/2009 | Son |
| 2009/0243998 A1 | 10/2009 | Wang |
| 2009/0256807 A1 | 10/2009 | Nurmi |
| 2009/0256817 A1 | 10/2009 | Perlin et al. |
| 2009/0282930 A1 | 11/2009 | Cheng et al. |
| 2009/0303400 A1 | 12/2009 | Hou et al. |
| 2009/0309852 A1 | 12/2009 | Lin et al. |
| 2009/0314551 A1 | 12/2009 | Nakajima |
| 2010/0013785 A1 | 1/2010 | Murai et al. |
| 2010/0020030 A1 | 1/2010 | Kim et al. |
| 2010/0020039 A1 | 1/2010 | Ricks et al. |
| 2010/0039396 A1 | 2/2010 | Ho et al. |
| 2010/0053087 A1 | 3/2010 | Dai et al. |
| 2010/0053116 A1 | 3/2010 | Daverman et al. |
| 2010/0066686 A1 | 3/2010 | Joguet et al. |
| 2010/0066697 A1 | 3/2010 | Jacomet et al. |
| 2010/0079391 A1 | 4/2010 | Joung |
| 2010/0079395 A1 | 4/2010 | Kim et al. |
| 2010/0079398 A1 | 4/2010 | Shen et al. |
| 2010/0097347 A1 | 4/2010 | Lin |
| 2010/0102403 A1 | 4/2010 | Celik-Butler |
| 2010/0117978 A1 | 5/2010 | Shirado |
| 2010/0123671 A1 | 5/2010 | Lee |
| 2010/0123686 A1 | 5/2010 | Klinghult et al. |
| 2010/0127140 A1 | 5/2010 | Smith |
| 2010/0128002 A1 | 5/2010 | Stacy et al. |
| 2010/0153891 A1 | 6/2010 | Vaananen et al. |
| 2010/0164959 A1 | 7/2010 | Brown et al. |
| 2010/0220065 A1 | 9/2010 | Ma |
| 2010/0271325 A1 | 10/2010 | Conte et al. |
| 2010/0289807 A1 | 11/2010 | Yu et al. |
| 2010/0295807 A1 | 11/2010 | Xie et al. |
| 2010/0308844 A1 | 12/2010 | Day et al. |
| 2010/0309714 A1 | 12/2010 | Meade |
| 2010/0315373 A1 | 12/2010 | Steinhauser et al. |
| 2010/0321310 A1 | 12/2010 | Kim et al. |
| 2010/0321319 A1 | 12/2010 | Hefti et al. |
| 2010/0323467 A1 | 12/2010 | Vaganov et al. |
| 2010/0328229 A1 | 12/2010 | Weber et al. |
| 2010/0328230 A1 | 12/2010 | Faubert et al. |
| 2011/0001723 A1 | 1/2011 | Fan |
| 2011/0006980 A1 | 1/2011 | Taniguchi et al. |
| 2011/0007008 A1 | 1/2011 | Algreatly |
| 2011/0012848 A1 | 1/2011 | Li et al. |
| 2011/0018820 A1 | 1/2011 | Huitema et al. |
| 2011/0032211 A1 | 2/2011 | Christoffersen |
| 2011/0039602 A1 | 2/2011 | McNamara et al. |
| 2011/0050628 A1 | 3/2011 | Homma et al. |
| 2011/0050630 A1 | 3/2011 | Ikeda |
| 2011/0057899 A1 | 3/2011 | Sleeman et al. |
| 2011/0063248 A1 | 3/2011 | Yoon |
| 2011/0113881 A1 | 5/2011 | Suzuki |
| 2011/0128250 A1 | 6/2011 | Murphy et al. |
| 2011/0141052 A1 | 6/2011 | Bernstein et al. |
| 2011/0141053 A1 | 6/2011 | Bulea et al. |
| 2011/0187674 A1 | 8/2011 | Baker et al. |
| 2011/0209555 A1 | 9/2011 | Ahles et al. |
| 2011/0227836 A1 | 9/2011 | Li et al. |
| 2011/0242014 A1 | 10/2011 | Tsai et al. |
| 2011/0267181 A1 | 11/2011 | Kildal |
| 2011/0267294 A1 | 11/2011 | Kildal |
| 2011/0273396 A1 | 11/2011 | Chung |
| 2011/0291951 A1 | 12/2011 | Tong |
| 2011/0298705 A1 | 12/2011 | Vaganov |
| 2011/0308324 A1 | 12/2011 | Gamage et al. |
| 2012/0032907 A1 | 2/2012 | Koizumi et al. |
| 2012/0032915 A1 | 2/2012 | Wittorf |
| 2012/0038579 A1 | 2/2012 | Sasaki |
| 2012/0044169 A1 | 2/2012 | Enami |
| 2012/0044172 A1 | 2/2012 | Ohki et al. |

(56) References Cited

U.S. PATENT DOCUMENTS

| | | |
|---|---|---|
| 2012/0050159 A1 | 3/2012 | Yu et al. |
| 2012/0050208 A1 | 3/2012 | Dietz |
| 2012/0056837 A1 | 3/2012 | Park et al. |
| 2012/0060605 A1 | 3/2012 | Wu et al. |
| 2012/0061823 A1 | 3/2012 | Wu et al. |
| 2012/0062603 A1 | 3/2012 | Mizunuma et al. |
| 2012/0068946 A1 | 3/2012 | Tang et al. |
| 2012/0068969 A1 | 3/2012 | Bogana et al. |
| 2012/0081327 A1 | 4/2012 | Heubel et al. |
| 2012/0086659 A1 | 4/2012 | Perlin et al. |
| 2012/0092250 A1 | 4/2012 | Hadas et al. |
| 2012/0092279 A1 | 4/2012 | Martin |
| 2012/0092294 A1 | 4/2012 | Ganapathi et al. |
| 2012/0092299 A1 | 4/2012 | Harada et al. |
| 2012/0092324 A1 | 4/2012 | Buchan et al. |
| 2012/0105358 A1 | 5/2012 | Momeyer et al. |
| 2012/0105367 A1 | 5/2012 | Son et al. |
| 2012/0113061 A1 | 5/2012 | Ikeda |
| 2012/0127088 A1 | 5/2012 | Pance et al. |
| 2012/0127107 A1 | 5/2012 | Miyashita et al. |
| 2012/0139864 A1 | 6/2012 | Sleeman et al. |
| 2012/0144921 A1 | 6/2012 | Bradley et al. |
| 2012/0146945 A1 | 6/2012 | Miyazawa et al. |
| 2012/0146946 A1 | 6/2012 | Wang et al. |
| 2012/0147052 A1 | 6/2012 | Homma et al. |
| 2012/0154315 A1 | 6/2012 | Aono |
| 2012/0154316 A1 | 6/2012 | Kono |
| 2012/0154317 A1 | 6/2012 | Aono |
| 2012/0154318 A1 | 6/2012 | Aono |
| 2012/0154328 A1 | 6/2012 | Kono |
| 2012/0154329 A1 | 6/2012 | Shinozaki |
| 2012/0154330 A1 | 6/2012 | Shimizu |
| 2012/0162122 A1 | 6/2012 | Geaghan |
| 2012/0169609 A1 | 7/2012 | Britton |
| 2012/0169617 A1 | 7/2012 | Mäenpää |
| 2012/0169635 A1 | 7/2012 | Liu |
| 2012/0169636 A1 | 7/2012 | Liu |
| 2012/0188181 A1 | 7/2012 | Ha et al. |
| 2012/0194460 A1 | 8/2012 | Kuwabara et al. |
| 2012/0194466 A1 | 8/2012 | Posamentier |
| 2012/0200526 A1 | 8/2012 | Lackey |
| 2012/0204653 A1 | 8/2012 | August et al. |
| 2012/0205165 A1 | 8/2012 | Strittmatter et al. |
| 2012/0218212 A1 | 8/2012 | Yu et al. |
| 2012/0234112 A1 | 9/2012 | Umetsu et al. |
| 2012/0356237 | 10/2012 | Lakamraju et al. |
| 2012/0286379 A1 | 11/2012 | Inoue |
| 2012/0319987 A1 | 12/2012 | Woo |
| 2012/0327025 A1 | 12/2012 | Huska et al. |
| 2013/0008263 A1 | 1/2013 | Kabasawa et al. |
| 2013/0038541 A1 | 2/2013 | Bakker |
| 2013/0093685 A1 | 4/2013 | Kalu et al. |
| 2013/0096849 A1 | 4/2013 | Campbell et al. |
| 2013/0140944 A1 | 6/2013 | Chen et al. |
| 2013/0187201 A1 | 7/2013 | Elian |
| 2013/0239700 A1 | 9/2013 | Benfield et al. |
| 2013/0255393 A1 | 10/2013 | Fukuzawa et al. |
| 2013/0341741 A1 | 12/2013 | Brosh |
| 2013/0341742 A1 | 12/2013 | Brosh |
| 2014/0007705 A1 | 1/2014 | Campbell et al. |
| 2014/0028575 A1 | 1/2014 | Parivar et al. |
| 2014/0055407 A1 | 2/2014 | Lee et al. |
| 2014/0090488 A1 | 4/2014 | Taylor et al. |
| 2014/0283604 A1 | 9/2014 | Najafi et al. |
| 2014/0367811 A1 | 12/2014 | Nakagawa et al. |
| 2015/0110295 A1 | 4/2015 | Jenkner et al. |
| 2015/0241465 A1 | 8/2015 | Konishi |
| 2016/0069927 A1 | 3/2016 | Hamamura |
| 2016/0245667 A1 | 8/2016 | Najafi et al. |
| 2016/0258825 A1* | 9/2016 | Gurin .................. G01L 1/2293 |
| 2016/0320426 A1* | 11/2016 | Boysel .................. G01P 15/18 |
| 2016/0332866 A1 | 11/2016 | Brosh et al. |
| 2016/0363490 A1 | 12/2016 | Campbell et al. |
| 2017/0066014 A1* | 3/2017 | Kidwell, Jr. .......... B81B 3/0097 |
| 2017/0103246 A1* | 4/2017 | Pi .......................... G06K 9/001 |
| 2017/0234744 A1 | 8/2017 | Tung et al. |
| 2018/0238753 A1* | 8/2018 | Abbasi Gavarti .... G01L 9/0002 |
| 2019/0383675 A1 | 12/2019 | Tsai et al. |
| 2019/0383676 A1 | 12/2019 | Foughi et al. |
| 2020/0149983 A1 | 5/2020 | Tsai et al. |

FOREIGN PATENT DOCUMENTS

| | | |
|---|---|---|
| CN | 101801837 A | 8/2010 |
| CN | 201653605 | 11/2010 |
| CN | 101929898 A | 12/2010 |
| CN | 102062662 A | 5/2011 |
| CN | 102998037 | 3/2013 |
| CN | 103308239 A | 9/2013 |
| CN | 102853950 A | 3/2015 |
| CN | 104535229 | 4/2015 |
| CN | 104581605 A | 4/2015 |
| CN | 104919293 A | 9/2015 |
| CN | 105934661 A | 9/2016 |
| DE | 102010012441 | 9/2011 |
| JP | 2004-156937 | 6/2004 |
| JP | 2010147268 | 7/2010 |
| WO | 93/10430 A | 5/1993 |
| WO | 2004/113859 | 12/2004 |
| WO | 2007/139695 | 12/2007 |
| WO | 2011065250 A1 | 6/2011 |
| WO | 2013/067548 | 5/2013 |
| WO | 2015/106246 A | 7/2015 |
| WO | 2019/023552 | 1/2019 |

OTHER PUBLICATIONS

Nesterov, V., et al., "Modelling and investigation of the silicon twin design 3D micro probe," Journal of Micromechanics and Microengineering, vol. 15, 2005, pp. 514-520.

International Search Report and Written Opinion issued in PCT/US2018/043616, dated Oct. 15, 2018.

* cited by examiner

INTEGRATED FINGERPRINT AND FORCE SENSOR

CROSS-REFERENCE TO RELATED APPLICATIONS

This application is a national stage application filed under 35 U.S.C. § 371 of PCT/US2018/043616 filed Jul. 25, 2018, which claims the benefit of U.S. provisional patent application No. 62/536,645, filed on Jul. 25, 2017, and entitled "INTEGRATED FINGERPRINT AND FORCE SENSOR," the disclosures of which is expressly incorporated herein by reference in their entireties.

FIELD OF TECHNOLOGY

The present disclosure relates to microelectromechanical ("MEMS") force sensing integrated with fingerprint sensor on the same complementary metal-oxide-semiconductor ("CMOS") chip.

BACKGROUND

In some mobile electronic devices, the home button is integrated with fingerprint sensor and a mechanical switch for user's convenience to simultaneously authenticate the user and turn on the device. With the increasing demand for a water proof standard for mobile devices, the mechanical button must be removed and replaced with other sensing mechanisms to turn on the device. It is therefore desired to have force integrated into such solution, but this requires extra space and elaborate mechanical design to support an extra sensor using conventional force sensing technology inside the already crowded mobile device chassis.

SUMMARY

The present disclosure pertains to a MEMS sensor including both fingerprint and force sensing on the same chip. The MEMS sensor can also include integrated circuits on the same chip. Such an integrated sensor can be created using complementary metal-oxide-semiconductor ("CMOS") process, where the force sensing elements can be formed through existing layers from CMOS process such as doped junction or poly-silicon layers. Alternatively or additionally, the force sensing elements can be formed by disposing piezoelectric layers after the CMOS process is completed and forming electrical connections to CMOS layers.

The fingerprint sensing can be implemented through capacitive sensing where the top metal layers can be used for such purpose. Alternatively, the same piezoelectric layer which is used for force sensing can be reconfigured to launch ultrasonic waves for fingerprint sensing purpose. Combinations of the different force and fingerprint sensing integration are contemplated and exemplified but not limited to such embodiments.

An example integrated microelectromechanical ("MEMS") force sensor is described herein. The integrated MEMS force sensor can include a sensor die, a plurality of fingerprint sensing elements arranged on the sensor die, a force sensing element arranged on the sensor die, and digital circuitry arranged on the sensor die. The fingerprint sensing elements can be configured to sense a fingerprint pattern. The force sensing element can be configured to convert a strain to an analog electrical signal that is proportional to the strain. The digital circuitry can be configured to convert the analog electrical signal to a digital electrical output signal.

Additionally, in some implementations, the force sensing element can be a piezoresistive element. Optionally, the piezoresistive element can be formed by diffusion or implantation. Optionally, the piezoresistive element can be formed by polysilicon processes during an integrated circuit process used to form the digital circuitry.

Alternatively or additionally, in other implementations, the force sensing element can be a piezoelectric element. The sensor die can further include an inter-metal dielectric (IMD) layer, and the piezoelectric element can be arranged on the IMD layer.

Alternatively or additionally, the plurality of fingerprint sensing elements can form a matrix of pixels on a surface of the sensor die.

Alternatively or additionally, the digital circuitry can be further configured to reconstruct the fingerprint pattern. For example, the fingerprint sensing elements can be operably coupled to the digital circuitry such that a signal (e.g., capacitance, ultrasonic wave, etc.) sensed by the fingerprint sensing element can be transferred to the digital circuitry for further processing.

Alternatively or additionally, in some implementations, the fingerprint sensing elements can form a matrix of conductive plates. For example, the sensor die can further include an inter-metal dielectric (IMD) layer, and the matrix of conductive plates can be arranged on the IMD layer. The fingerprint sensing elements can be operably coupled to the digital circuitry. Additionally, the digital circuitry can be further configured to measure capacitance at each of the fingerprint sensing elements, and reconstruct the fingerprint pattern using the capacitance measured at each of the fingerprint sensing elements.

Alternatively or additionally, in other implementations, the fingerprint sensing elements can form a matrix of ultrasonic transducer pixels. For example, the sensor die can further include an inter-metal dielectric (IMD) layer, and the matrix of ultrasonic transducer pixels can be arranged on the IMD layer. Each of the ultrasonic transducer pixels can include a piezoelectric element such that the ultrasonic transducer pixels can be configured to emit and sense ultrasonic waves. The fingerprint sensing elements can be operably coupled to the digital circuitry. Additionally, the digital circuitry can be further configured to reconstruct the fingerprint pattern using the ultrasonic waves.

Alternatively or additionally, the digital circuitry can be formed by complementary metal-oxide-semiconductor ("CMOS") process.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE FIGURES

The components in the drawings are not necessarily to scale relative to each other. Like reference numerals designate corresponding parts throughout the several views. These and other features of will become more apparent in the detailed description in which reference is made to the appended drawings wherein.

DETAILED DESCRIPTION

The present disclosure can be understood more readily by reference to the following detailed description, examples, drawings, and their previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching. To this end, those skilled in the relevant art will recognize and appreciate that many changes can be made, while still obtaining beneficial results. It will also be apparent that some of the desired benefits can be obtained by selecting some of the features without utilizing other features. Accordingly, those who work in the art will recognize that many modifications and adaptations may be possible and can even be desirable in certain circumstances, and are contemplated by this disclosure. Thus, the following description is provided as illustrative of the principles and not in limitation thereof.

As used throughout, the singular forms "a," "an" and "the" include plural referents unless the context clearly dictates otherwise. Thus, for example, reference to "a sensing element" can include two or more such sensing elements unless the context indicates otherwise.

The term "comprising" and variations thereof as used herein is used synonymously with the term "including" and variations thereof and are open, non-limiting terms.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Figure 1:
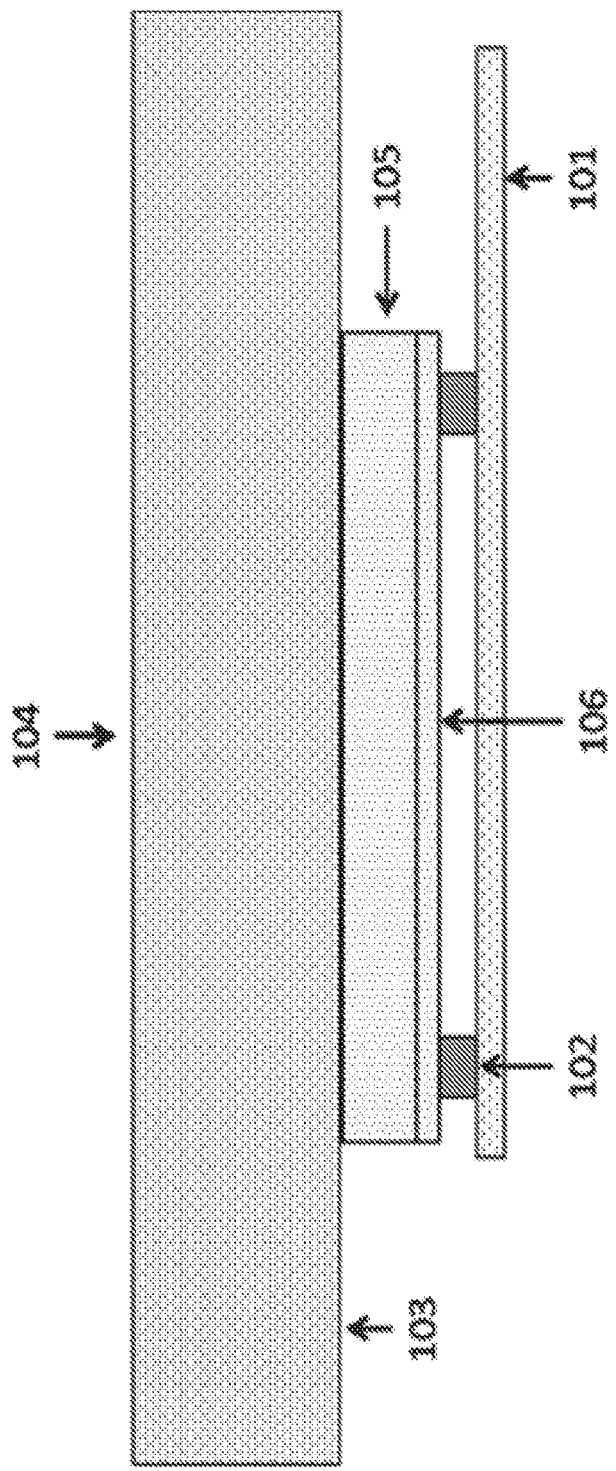
FIG. 1 is a cross-sectional view of an example integrated MEMS sensor attached to the sensing plate with CMOS side facing down.
Figure 2:
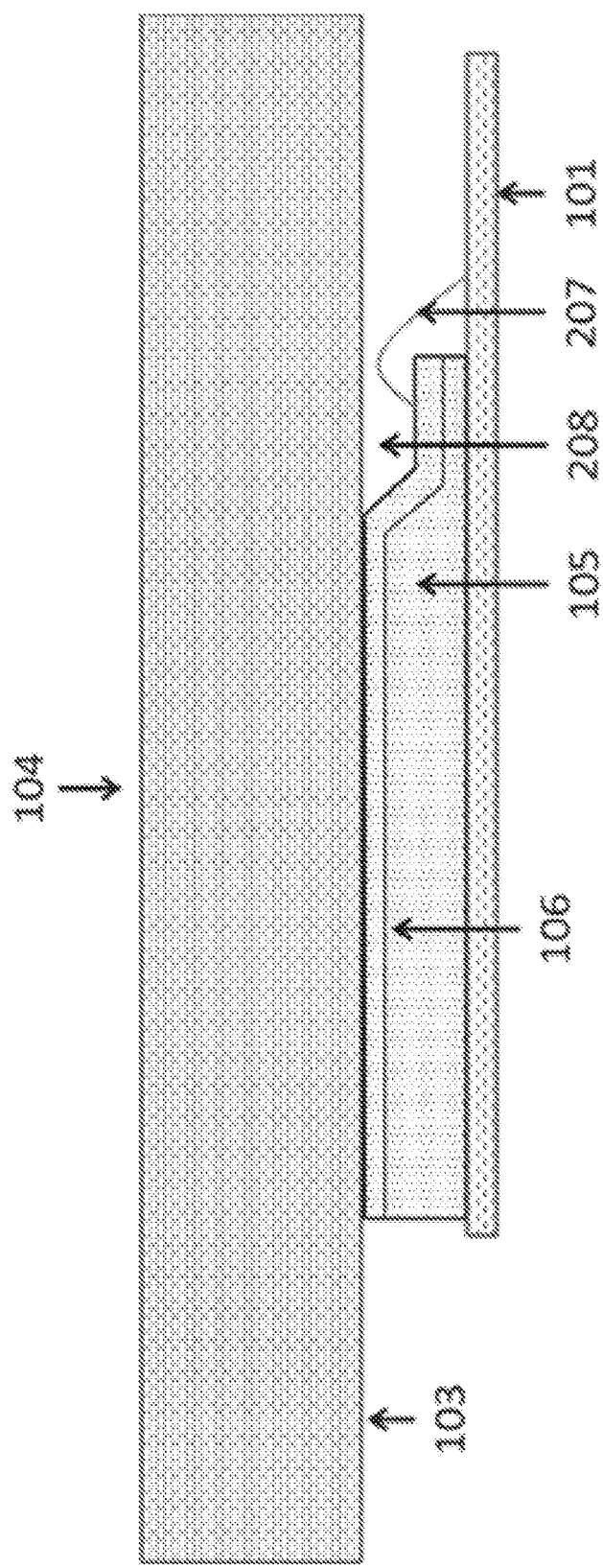
FIG. 2 is a cross-sectional view of another example integrated MEMS sensor attached to the sensing plate with CMOS side facing up.

Described herein are integrated fingerprint and force sensors in a single chip. This disclosure contemplates that the assembly of such solution can be represented in the face-down or face-up configuration as depicted in FIG. 1 and FIG. 2, respectively. In FIGS. 1 and 2, a chip 105 (i.e., a sensor die) that includes both fingerprint sensing elements and force sensing elements is shown. Integration of both fingerprint and force sensing elements is described below with regard to FIGS. 3-6. As shown in FIGS. 1 and 2, the chip 105 is placed in contact with a sensing surface 104. This disclosure contemplates that the sensing surface 104 can be the part of a force-sensitive device (such as a mobile device) to which a force "F" is applied. The sensing surface 104 has opposing surfaces (e.g., top and bottom sides). The chip 105 is attached to the bottom side 103 of the sensing surface 104 in FIGS. 1 and 2. In FIG. 1, the chip 105 is attached to a flexible circuit board 101 through a solder joint 102. The solder joint 102 can serve as both electrical and mechanical connections. It should be understood that the number of solder joints 102 (i.e., two) shown in FIG. 1 is only provided as an example. This disclosure contemplates using more or less than two solder joints to attach the chip 105 to the flexible circuit board 101. Additionally, the CMOS circuitry side 106 of the chip 105 is facing away from (or down relative to) the sensing surface 104 with the chip 105 attached to the bottom side 103 of the sensing surface 104.

In FIG. 2, the chip is mechanically mounted to the flexible circuit board 101 with an electrical connection using a wire bond 207. It should be understood that the number of wire bonds (i.e., one) shown in FIG. 2 is only provided as an example. This disclosure contemplates using more or less than one wire bond to electrically couple the chip 105 to the flexible circuit board 101. Additionally, the CMOS circuitry side 106 of the chip 105 is facing toward (or up relative to) the sensing surface 104 with the CMOS circuitry side 106 of the chip 105 attached to the bottom surface 103 of the sensing plate 104. In order to provide space for the wire bond 207, a recess 208 can be provided on the chip 105. This disclosure contemplates that the flexible circuit board 101 can also be mechanically supported, i.e., the disclosure is not intended to be limited to the floating configuration shown in FIGS. 1 and 2.

Figure 3:
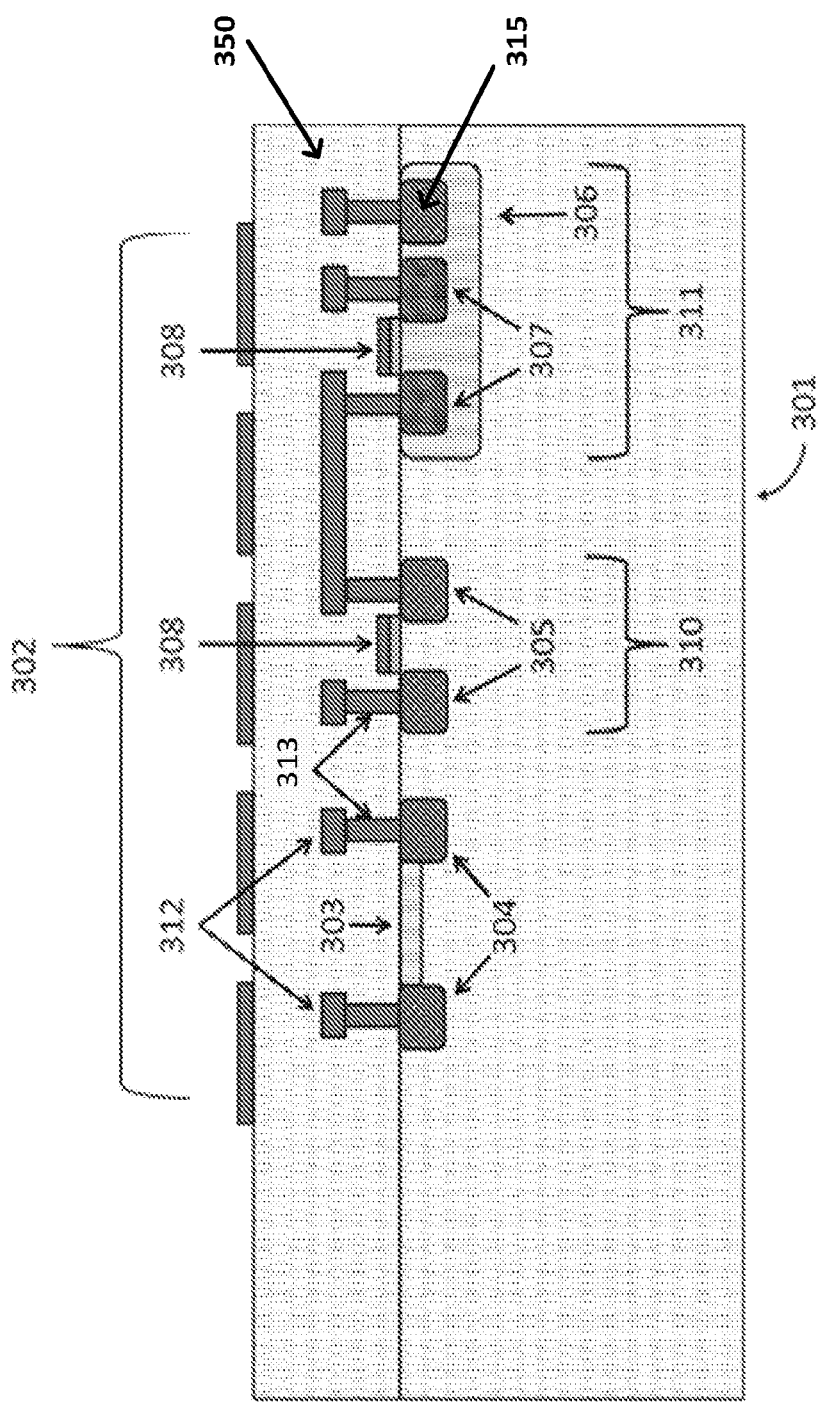
FIG. 3 is a cross-sectional view of an example capacitive fingerprint and piezoresistive force sensing integration according to one implementation described herein.

Referring now to FIG. 3, a MEMS force sensor including an integrated sensor die with a combination of capacitive fingerprint sensing elements, piezoresistive sensing elements, and digital circuitry (e.g., CMOS circuitry) is shown. As depicted in FIG. 3, a cross-section of the MEMS force sensor using an integrated p-type MEMS-CMOS force sensor with a piezoresistive sensing element is shown. The chip (i.e., sensor die) includes a p-type silicon substrate 301 and an inter-metal dielectric (IMD) layer 350. Both an n-type metal-oxide-semiconductor (nMOS) transistor 310 and a p-type metal-oxide-semiconductor (pMOS) transistor 311 are fabricated on p-type silicon substrate 301. The p-type silicon substrate 301 can be a single continuous piece of material, i.e., the substrate can be monolithic. The nMOS source/drain 305 and pMOS source/drain 307 are formed through diffusion or implantation. As shown in FIG. 3, the pMOS source/drain 307 are heavily-doped p-type regions residing in a lightly-doped n-well region 306, which receives a voltage bias through a heavily-doped n-type implant 315. The nMOS source/drain 305 are heavily-doped n-type regions formed directly on the p-type silicon substrate 301. Further, a gate contact 308 (e.g., poly silicon gate) forms the channel required for each of the nMOS transistor 310 and pMOS transistor 311. The gate 308 can be formed with poly silicon with a thin oxide layer above the channel between each of the transistors. Although a p-type MEMS-CMOS force sensor is shown in FIG. 3, it should be understood that similar CMOS processes can be adapted to other starting materials, such as an n-type silicon substrate.

Additionally, although a silicon substrate is provided as an example, this disclosure contemplates that the substrate can be made from a material other than silicon. Additionally, this disclosure contemplates that the MEMS force sensor can include a plurality of nMOS and pMOS devices. The nMOS and pMOS devices can form various components of the digital circuitry (e.g., CMOS circuitry). The digital circuitry can optionally include other components, which are not depicted in FIG. 3, including, but not limited to, bipolar transistors; metal-insulator-metal ("MIM") and metal-oxide-semiconductor ("MOS") capacitors; diffused, implanted, and polysilicon resistors; and/or diodes. The digital circuitry can include, but is not limited to, one or more of a differential amplifier or buffer, an analog-to-digital converter, a clock generator, non-volatile memory, and a communication bus. For example, the digital circuitry can include an on-chip buffer for storing the respective digital electrical output signals.

In addition to the nMOS and pMOS transistors 310 and 311 shown in FIG. 3, a lightly doped n-type piezoresistive sensing element 303 (sometimes referred to herein as a "force sensing element") and a heavily doped n-type contact region 304 are formed on the same p-type silicon substrate 301. In other words, the piezoresistive sensing element and digital circuitry can be disposed on the same monolithic substrate. Accordingly, the process used to form the piezoresistive sensing element can be compatible with the process used to form the digital circuitry (e.g., the CMOS process). The lightly doped n-type piezoresistive sensing element 303 and heavily doped n-type contact region 304 can be formed by way of either diffusion, deposition, or implant patterned with a lithographic exposure process. This disclosure contemplates that the MEMS force sensor can include a plurality of piezoresistive sensing elements. Additionally, metal layers 312 and contact layers 313 can be provided to create electrical connections between the nMOS and pMOS transistors 310 and 311 and the piezoresistive sensing element 303.

The piezoresistive sensing elements 303 can change resistance in response to deflection of a portion of the sensor die. For example, as strain is induced in the sensor die proportional to the force applied to the MEMS force sensor, a localized strain is produced on a piezoresistive sensing element such that the piezoresistive sensing element experiences compression or tension, depending on its specific orientation. As the piezoresistive sensing element compresses and tenses, its resistivity changes in opposite fashion. Accordingly, a Wheatstone bridge circuit including a plurality (e.g., four) piezoresistive sensing elements (e.g., two of each orientation relative to strain) becomes unbalanced and produces a differential voltage. This differential voltage is directly proportional to the force applied to the MEMS force sensor. This disclosure contemplates that this differential voltage can be received at and processed by the digital circuitry. For example, the digital circuitry can be configured to, among other functions, convert an analog electrical signal to a digital electrical output signal. Example MEMS force sensors using piezoresistive sensing elements are described in U.S. Pat. No. 9,487,388, issued Nov. 8, 2016 and entitled "Ruggedized MEMS Force Die;" U.S. Pat. No. 9,493,342, issued Nov. 15, 2016 and entitled "Wafer Level MEMS Force Dies;" U.S. Pat. No. 9,902,611, issued Feb. 27, 2018 and entitled "Miniaturized and ruggedized wafer level mems force sensors;" and U.S. Patent Application Publication No. 2016/0363490 to Campbell et al., filed Jun. 10, 2016 and entitled "Ruggedized wafer level mems force sensor with a tolerance trench," the disclosures of which are incorporated by reference in their entireties.

The MEMS force sensor shown in FIG. 3 can include a capacitive fingerprint sensor. For example, the MEMS force sensor can include a plurality of fingerprint sensing elements 302 (e.g., conductive plates) arranged at a surface of the IMD layer 350. The fingerprint sensing elements 302 can form a matrix of conductive plates. The conductive plates can optionally be made of copper or an aluminum-silicon-copper (Al—Si—Cu) alloy, which are conductive materials used in conventional CMOS processes. Each of the fingerprint sensing elements 302 is a pixel in the matrix. This disclosure contemplates that the matrix can be an n×m matrix of conductive plates, where n and m are integers. In some implementations, n can equal m. In other implementations, n does not equal m. It should be understood that the number of conductive plates in the matrix effects the resolution of the fingerprint sensor. Using more conductive plates increases the resolution of the fingerprint sensor, while using less conductive plates decreases the resolution of the fingerprint sensor. Additionally, each of the fingerprint sensing elements 302 can be connected to a respective capacitor circuit (not shown), which stores an electrical charge. A fingerprint is a pattern of ridges and valleys in the skin at the surface of finger. The distance from the ridge/valley to fingerprint sensing element 302 modulates the capacitance or charges stored in the capacitor circuit thus making it possible to process and re-construct the fingerprint pattern with the digital circuitry. This disclosure contemplates that the fingerprint sensor (e.g., the fingerprint sensing elements 302 and respective capacitors) can be operably coupled to the digital circuitry (e.g., the CMOS circuitry described above) such that the fingerprint pattern can be digitally reconstructed by the digital circuitry. Accordingly, the MEMS force sensor shown in FIG. 3 includes a piezoresistive sensing element 303, fingerprint sensing elements 302, and digital circuitry (e.g., nMOS and pMOS devices) all on the same chip.

Figure 4:
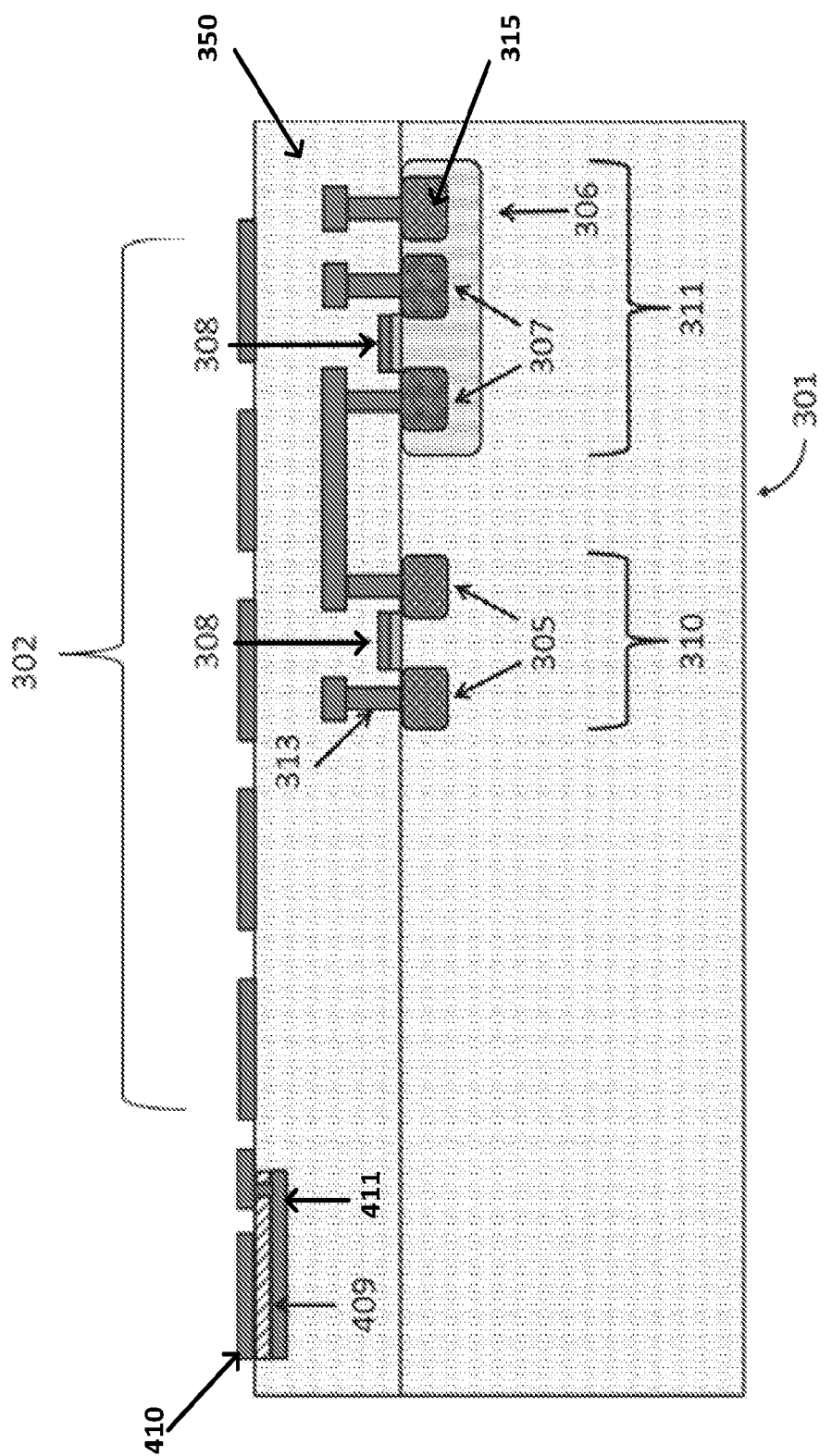
FIG. 4 is a cross-sectional view of an example capacitive fingerprint and piezoelectric force sensing integration according to one implementation described herein.

Referring now to FIG. 4, another example MEMS force sensor including an integrated sensor die with a combination of capacitive fingerprint sensing elements, piezoelectric sensing elements, and digital circuitry (e.g., CMOS circuitry) is shown. As depicted in FIG. 4, a cross-section of the MEMS force sensor using an integrated p-type MEMS-CMOS force sensor with a piezoelectric sensing element is shown. The chip (i.e., sensor die) includes a p-type silicon substrate 301 and an inter-metal dielectric (IMD) layer 350. Both an n-type metal-oxide-semiconductor (nMOS) transistor 310 and a p-type metal-oxide-semiconductor (pMOS) transistor 311 are fabricated on p-type silicon substrate 301. The p-type silicon substrate 301 can be a single continuous piece of material, i.e., the substrate can be monolithic. The nMOS source/drain 305 and pMOS source/drain 307 are formed through diffusion or implantation. As shown in FIG. 4, the pMOS source/drain 307 are heavily-doped p-type regions residing in a lightly-doped n-well region 306, which receives a voltage bias through a heavily-doped n-type implant 315. The nMOS source/drain 305 are heavily-doped n-type regions formed directly on the p-type silicon substrate 301. Further, a gate contact 308 (e.g., poly silicon gate) forms the channel required for each of the nMOS transistor 310 and pMOS transistor 311. The gate 308 can be formed with poly silicon with a thin oxide layer above the channel between each of the transistors. Although a p-type MEMS-CMOS force sensor is shown in FIG. 4, it should be understood that similar CMOS processes can be adapted to other starting materials, such as an n-type silicon substrate.

Additionally, although a silicon substrate is provided as an example, this disclosure contemplates that the substrate can be made from a material other than silicon. As described above, this disclosure contemplates that the MEMS force sensor can include a plurality of nMOS and pMOS devices, and the nMOS and pMOS devices can form various components of the digital circuitry (e.g., CMOS circuitry). The digital circuitry can optionally include other components, which are not depicted in FIG. 4, including, but not limited to, bipolar transistors; metal-insulator-metal ("MIM") and metal-oxide-semiconductor ("MOS") capacitors; diffused, implanted, and polysilicon resistors; and/or diodes. The digital circuitry can include, but is not limited to, one or more of a differential amplifier or buffer, an analog-to-digital converter, a clock generator, non-volatile memory, and a communication bus. For example, the digital circuitry can include an on-chip buffer for storing the respective digital electrical output signals.

The MEMS force sensor shown in FIG. 4 can also include a piezoelectric element 409 (sometimes referred to herein as a "force sensing element"), which is arranged between opposing electrodes 410, 411. As shown in FIG. 4, the piezoelectric element 409 and opposing electrodes 410, 411 are arranged on the IMD layer 350. The piezoelectric element 409 can be formed after completion of the integrated circuit process used to form the digital circuitry (e.g., the CMOS process). It should be understood that a single piezoelectric element is shown in FIG. 4 only as an example. This disclosure contemplates that the MEMS force sensor can include a plurality of piezoelectric elements. When a force is applied to the MEMS force sensor, the strain is transferred to piezoelectric element 409, which converts the strain into charge. In other words, the piezoelectric element 409 can change an electrical characteristic (i.e., charge) in response to deflection of a portion of the MEMS force sensor. Thus, the change in electrical characteristic can be detected as an analog electrical signal (e.g., change in voltage) at the opposing electrodes 410, 411. The analog electrical signal can be transferred to the digital circuitry (e.g., the CMOS circuitry described above) for further processing. This disclosure contemplates that the change in voltage can be correlated with the amount of "F" applied to the MEMS force sensor. Additionally, metal layers and contact layers 313 can be provided to create electrical connections between the nMOS and pMOS transistors 310 and 311 and the piezoelectric element 409.

The MEMS force sensor shown in FIG. 4 can also include a capacitive fingerprint sensor. For example, the MEMS force sensor can include a plurality of fingerprint sensing elements 302 (e.g., conductive plates) arranged on the IMD layer 350. The capacitive fingerprint sensor is described above with regard to FIG. 3 and is therefore not described in further detail below. Accordingly, the MEMS force sensor shown in FIG. 4 includes a piezoelectric element 409, fingerprint sensing elements 302, and digital circuitry (e.g., nMOS and pMOS devices) all on the same chip.

Figure 5:
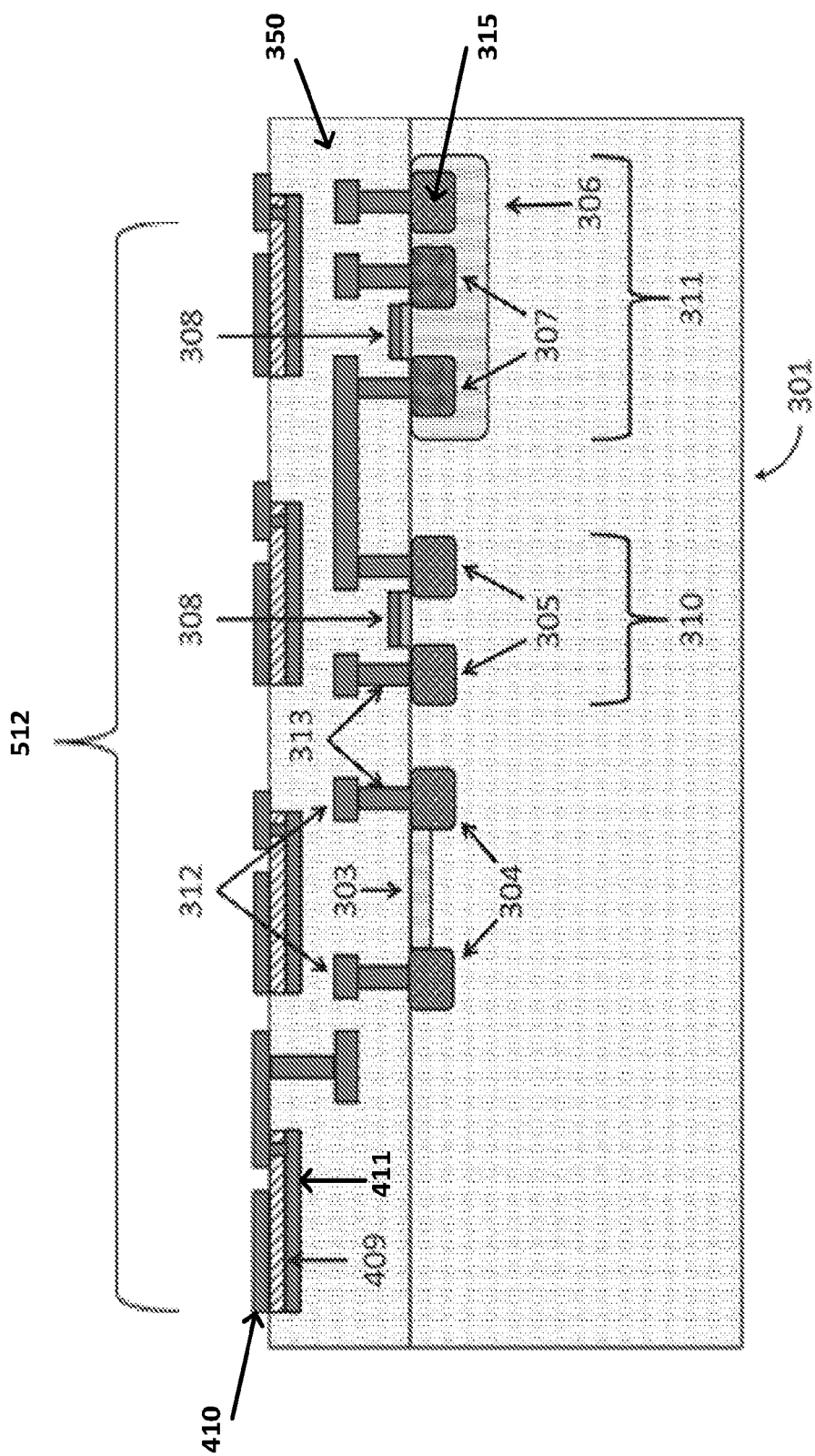
FIG. 5 is a cross-sectional view of an example ultrasonic fingerprint and piezoresistive force sensing integration according to one implementation described herein.

Referring now to FIG. 5, another example MEMS force sensor including an integrated sensor die with a combination of ultrasonic fingerprint sensing elements, piezoresistive sensing elements, and digital circuitry (e.g., CMOS circuitry) is shown. As depicted in FIG. 5, a cross-section of the MEMS force sensor using an integrated p-type MEMS-CMOS force sensor with a piezoresistive sensing element is shown. The chip (i.e., sensor die) includes a p-type silicon substrate 301 and an inter-metal dielectric (IMD) layer 350. Both an n-type metal-oxide-semiconductor (nMOS) transistor 310 and a p-type metal-oxide-semiconductor (pMOS) transistor 311 are fabricated on p-type silicon substrate 301. The nMOS source/drain 305 and pMOS source/drain 307 are formed through diffusion or implantation. As shown in FIG. 5, the pMOS source/drain 307 are heavily-doped p-type regions residing in a lightly-doped n-well region 306, which receives a voltage bias through a heavily-doped n-type implant 315. The nMOS source/drain 305 are heavily-doped n-type regions formed directly on the p-type silicon substrate 301. Further, a gate contact 308 (e.g., poly silicon gate) forms the channel required for each of the nMOS transistor 310 and pMOS transistor 311. In addition to the nMOS and pMOS transistors 310 and 311 shown in FIG. 5, a lightly doped n-type piezoresistive sensing element 303 and a heavily doped n-type contact region 304 are formed on the same p-type silicon substrate 301. In other words, the piezoresistive sensing element and digital circuitry can be disposed on the same monolithic substrate. Accordingly, the process used to form the piezoresistive sensing element can be compatible with the process used to form the digital circuitry (e.g., the CMOS process). Additionally, metal layers 312 and contact layers 313 can be provided to create electrical connections between the nMOS and pMOS transistors 310 and 311 and the piezoresistive sensing element 303. It should be understood that the piezoresistive sensing elements and digital circuitry (e.g., CMOS circuitry) is the same as described above with regard to FIG. 3 and is therefore not described in further detail below.

The MEMS force sensor shown in FIG. 5 can include an ultrasonic fingerprint sensor. For example, as depicted in FIG. 5, the MEMS force sensor can include a plurality of ultrasonic transducer pixels 512 arranged on the IMD layer 350. Each ultrasonic transducer pixel 512 can include a piezoelectric element 409, which is arranged between opposing electrodes 410, 411. The ultrasonic transducer pixels 512 can be formed after completion of the integrated circuit process used to form the digital circuitry (e.g., the CMOS process). The ultrasonic transducer pixels 512 can form a matrix. This disclosure contemplates that the matrix can be an n×m matrix of pixels, where n and m are integers. In some implementations, n can equal m. In other implementations, n does not equal m.

Each ultrasonic transducer pixel 512 can emit ultrasonic waves and can also sense the reflected signal in a scan pattern. In other words, each ultrasonic transducer pixel 512 can act as a transmitter and a receiver. As described above, a fingerprint is a pattern of ridges and valleys in the skin at the surface of finger. When an ultrasonic wave is transmitted against the finger, portions of the wave are absorbed by the finger and portions of the wave are reflected back towards the fingerprint sensor. This depends on the pattern of ridges and valleys. This disclosure contemplates that the fingerprint sensor (e.g., the ultrasonic transducer pixels 512) can be operably coupled to the digital circuitry (e.g., the CMOS circuitry described above) such that the fingerprint pattern can be digitally reconstructed by the digital circuitry. For example, the ultrasonic waves sensed at the ultrasonic transducer pixels 512 can be transferred to the digital circuitry for processing, and the digital circuitry can be configured to reconstruct the fingerprint pattern from such data. Accordingly, the MEMS force sensor shown in FIG. 5 includes a piezoresistive sensing element 303, ultrasonic transducer pixels 512, and digital circuitry (e.g., nMOS and pMOS devices) all on the same chip.

Figure 6:
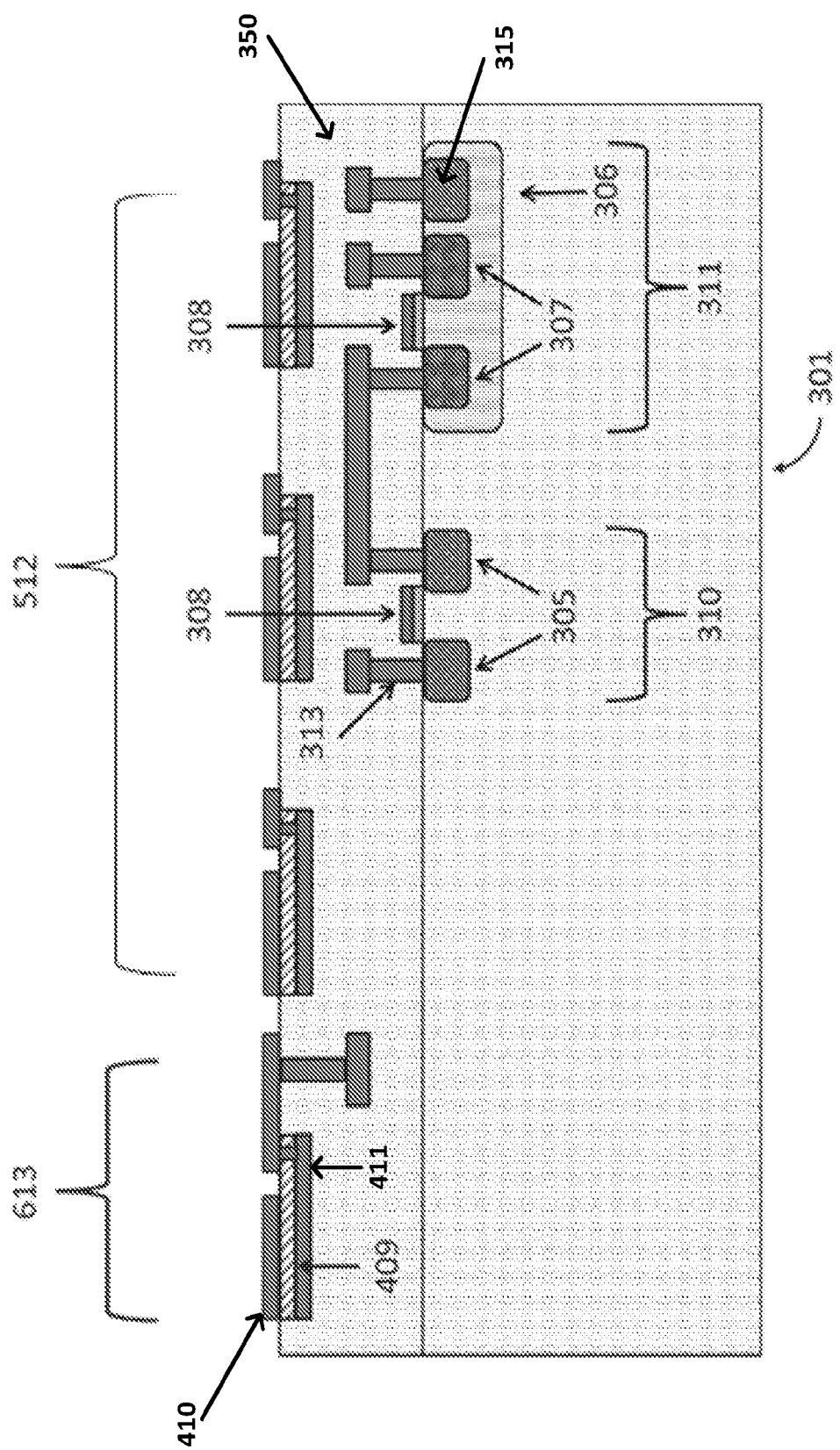
FIG. 6 is a cross-sectional view of an example ultrasonic fingerprint and piezoelectric force sensing integration according to one implementation described herein.

Referring now to FIG. 6, another example MEMS force sensor including an integrated sensor die with a combination of ultrasonic fingerprint sensing elements, piezoelectric sensing elements, and digital circuitry (e.g., CMOS circuitry) is shown. As depicted in FIG. 6, a cross-section of the MEMS force sensor using an integrated p-type MEMS-CMOS force sensor with a piezoresistive sensing element is shown. The chip (i.e., sensor die) includes a p-type silicon substrate 301 and an inter-metal dielectric (IMD) layer 350. Both an n-type metal-oxide-semiconductor (nMOS) transistor 310 and a p-type metal-oxide-semiconductor (pMOS) transistor 311 are fabricated on p-type silicon substrate 301. The nMOS source/drain 305 and pMOS source/drain 307 are formed through diffusion or implantation. As shown in FIG. 6, the pMOS source/drain 307 are heavily-doped p-type regions residing in a lightly-doped n-well region 306, which receives a voltage bias through a heavily-doped n-type implant 315. The nMOS source/drain 305 are heavily-doped n-type regions formed directly on the p-type silicon substrate 301. Further, a gate contact 308 (e.g., poly silicon gate) forms the channel required for each of the nMOS transistor 310 and pMOS transistor 311. It should be understood that the digital circuitry (e.g., CMOS circuitry) is the same as described above with regard to FIG. 4 and is therefore not described in further detail below.

The MEMS force sensor shown in FIG. 6 can also include a force sensing element 613 and an ultrasonic fingerprint sensor. As depicted in FIG. 6, the MEMS force sensor can include a piezoelectric force sensing element 613 and a plurality of ultrasonic transducer pixels 512 arranged on the IMD layer 350. It should be understood that a single piezoelectric force sensing element 613 is shown in FIG. 6 only as an example. This disclosure contemplates that the MEMS force sensor can include a plurality of piezoelectric force sensing elements. Each piezoelectric force sensing element 613 and each ultrasonic transducer pixel 512 can include a piezoelectric element 409, which is arranged between opposing electrodes 410, 411. The piezoelectric force sensing element 613 and the ultrasonic transducer pixels 512 can be formed after completion of the integrated circuit process used to form the digital circuitry (e.g., the CMOS process). Additionally, metal layers and contact layers 313 can be provided to create electrical connections between the nMOS and pMOS transistors 310 and 311 and the piezoelectric force sensing element 613. Piezoelectric force sensing elements are described above with regard to FIG. 4 and ultrasonic transducer pixels are described above with regard to FIG. 6 and therefore these elements are not described in further detail below. Accordingly, the MEMS force sensor shown in FIG. 6 includes a piezoelectric force sensing element 613, ultrasonic transducer pixels 512, and digital circuitry (e.g., nMOS and pMOS devices) all on the same chip.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An integrated microelectromechanical ("MEMS") force sensor, comprising:
   a sensor die comprising an inter-metal dielectric (IMD) layer arranged over a substrate,
   a plurality of fingerprint sensing elements arranged on the sensor die, wherein:
      the fingerprint sensing elements comprise conductive plates arranged on the IMD layer, and
      the plurality of fingerprint sensing elements is configured to sense a fingerprint pattern,
   a force sensing element arranged on the sensor die, wherein the force sensing element is configured to convert a strain to an analog electrical signal that is proportional to the strain, and
   digital circuitry arranged on the sensor die, wherein the digital circuitry is configured to convert the analog electrical signal to a digital electrical output signal.

2. The integrated MEMS force sensor of claim 1, wherein the force sensing element is a piezoresistive element.

3. The integrated MEMS force sensor of claim 2, wherein the piezoresistive element is formed by diffusion or implantation.

4. The integrated MEMS force sensor of claim 2, wherein the piezoresistive element is formed by polysilicon processes during an integrated circuit process used to form the digital circuitry.

5. The integrated MEMS force sensor of claim 1, wherein the force sensing element is a piezoelectric element.

6. The integrated MEMS force sensor of claim 5, wherein the piezoelectric element is arranged on the IMD layer.

7. The integrated MEMS force sensor of claim 1, wherein the plurality of fingerprint sensing elements form a matrix of pixels on a surface of the sensor die.

8. The integrated MEMS force sensor of claim 1, wherein the digital circuitry is further configured to reconstruct the fingerprint pattern.

9. The integrated MEMS force sensor of claim 8, wherein the fingerprint sensing elements are operably coupled to the digital circuitry.

10. The integrated MEMS force sensor of claim 1, wherein the fingerprint sensing elements are operably coupled to the digital circuitry.

11. The integrated MEMS force sensor of claim 1, wherein the digital circuitry is further configured to measure capacitance at each of the fingerprint sensing elements.

12. The integrated MEMS force sensor of claim 11, wherein the digital circuitry is configured to reconstruct the fingerprint pattern using the capacitance measured at each of the fingerprint sensing elements.

13. The integrated MEMS force sensor of claim 1, wherein the digital circuitry is formed by complementary metal-oxide-semiconductor ("CMOS") process.

14. An integrated microelectromechanical ("MEMS") sensor, comprising:
   a sensing plate; and
   a sensor die attached to a bottom surface of the sensing plate, the sensor die comprising:
      an inter-metal dielectric (IMD) layer arranged over a substrate,
      a plurality of conductive plates arranged on the IMD layer, the plurality of conductive plates configured to sense a fingerprint pattern, and
      a force sensing element configured to convert a strain to an analog electrical signal that is proportional to the strain.

15. The integrated MEMS sensor of claim 14, wherein the sensor die further comprises digital circuitry operably coupled to the force sensing element, the digital circuitry configured to convert the analog electrical signal to a digital electrical output signal.

16. The integrated MEMS sensor of claim 14, further comprising a flexible circuit board operably coupled to the sensor die.

17. The integrated MEMS sensor of claim 14, wherein the sensor die further comprises digital circuitry operably coupled to the plurality of conductive plates, the digital circuitry configured to measure capacitance at each conductive plate in the plurality of conductive plates.

18. The integrated MEMS sensor of claim 17, wherein the digital circuitry is configured to reconstruct the fingerprint pattern using the capacitance measured at each conductive plate in the plurality of conductive plates.

19. The integrated MEMS sensor of claim 14, wherein the force sensing element is one of a piezoresistive element or a piezoelectric element arranged between opposing electrodes.

20. The integrated MEMS sensor of claim 19, wherein the piezoresistive element or the piezoelectric element is arranged on the IMD layer.

* * * * *